United States Patent [10] Patent No.: US 11,538,293 B2
Ahearne et al. (45) Date of Patent: Dec. 27, 2022

(54) PREPARATION OF VEHICLE BULK DATA FOR HIGH SPEED TERAHERTZ OFFLOADING

(71) Applicant: EMC IP Holding Company LLC, Hopkinton, MA (US)

(72) Inventors: Seán Ahearne, Douglas (IE); Liam Murphy, Rochestown (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 248 days.

(21) Appl. No.: 16/915,226

(22) Filed: Jun. 29, 2020

(65) Prior Publication Data

US 2021/0407224 A1 Dec. 30, 2021

(51) Int. Cl.
| | |
|---|---|
| G07C 5/08 | (2006.01) |
| G07C 5/00 | (2006.01) |
| H04W 4/46 | (2018.01) |
| H04W 4/70 | (2018.01) |
| H04W 4/38 | (2018.01) |
| H04W 4/44 | (2018.01) |

(52) U.S. Cl.
CPC ............ *G07C 5/085* (2013.01); *G07C 5/008* (2013.01); *H04W 4/38* (2018.02); *H04W 4/44* (2018.02); *H04W 4/46* (2018.02); *H04W 4/70* (2018.02)

(58) Field of Classification Search
CPC ......... G07C 5/085; G07C 5/008; H04W 4/46; H04W 4/70; H04W 4/38; H04W 4/44; H04W 4/40; H04W 4/48
See application file for complete search history.

(56) References Cited

U.S. PATENT DOCUMENTS

| | | | |
|---|---|---|---|
| 2019/0316919 A1* | 10/2019 | Keshavamurthy | ......................... G08G 1/096844 |
| 2020/0097437 A1* | 3/2020 | Boehm | ............. G06F 15/17331 |
| 2020/0259763 A1* | 8/2020 | Guim Bernat | ...... H04L 43/0882 |
| 2021/0144517 A1* | 5/2021 | Guim Bernat | ........ G06F 9/4881 |

FOREIGN PATENT DOCUMENTS

WO WO-2017186277 A1 * 11/2017 ............. H04L 12/66

* cited by examiner

*Primary Examiner* — Omar J Ghowrwal
(74) *Attorney, Agent, or Firm* — Workman Nydegger

(57) ABSTRACT

One example method includes collecting data concerning operation of a vehicle, and the collecting is performed by one or more sensors of the vehicle, storing the data in the data storage locally at the vehicle, automatically caching the stored data in the cache memory locally at the vehicle, and uploading the cached data to a node over a THz wireless link. The stored data may be automatically cached according to requirements specified in a data model, and the cached data may be prioritized for uploading according to requirements specified in the data model.

20 Claims, 4 Drawing Sheets

PREPARATION OF VEHICLE BULK DATA FOR HIGH SPEED TERAHERTZ OFFLOADING

FIELD OF THE INVENTION

Embodiments of the present invention generally relate to management of bulk data. More particularly, at least some embodiments of the invention relate to systems, hardware, software, computer-readable media, and methods for preparing vehicle bulk data for high speed offloading. Wireless communications as disclosed herein may implemented by systems, components, and standards such as those sold in connection with the WIFI® mark.

BACKGROUND

With the increasing prevalence of Intelligent Connected Vehicles (ICV), the amount of data generated by each vehicle is increasing rapidly. These large data volumes are required by these vehicles in order to enable breakthrough features such as effective autonomous driving. However, as the volume of data generated by ICVs continues to increase, the costs involved in storing and collecting that data also increases. Vehicle manufacturers and companies implementing autonomous fleet vehicles need to find an effective method of colleting large amounts of vehicle data while minimizing the costs associated with data storage, data collection, and vehicle downtime.

Currently, collection of bulk data on vehicles typically takes the form of physical removal of the data storage hardware from the vehicle after testing, or transmission of the data using the traditional wireless technology WIFI® while the vehicle is idle. Both of these solutions are quite costly as they require either expensive man hours to remove the data storage hardware and offload the data, or reduce the productivity time of the vehicle while it is idle when uploading data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
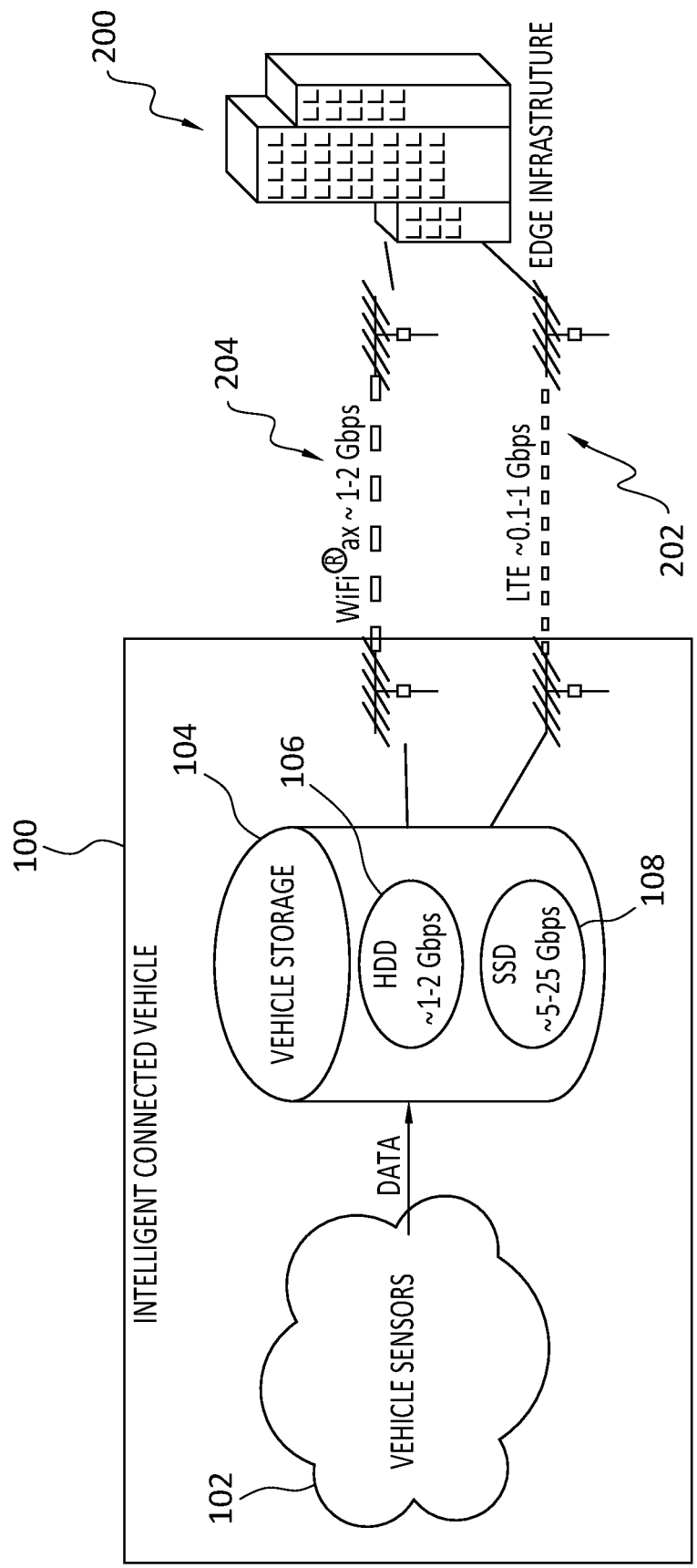
FIG. 1 discloses aspects of a comparative example of a data caching and transmission configuration.

Embodiments of the present invention generally relate to management of bulk data More particularly, at least some embodiments of the invention relate to systems, hardware, software, computer-readable media, and methods for preparing vehicle bulk data for high speed offloading, where some particular embodiments may employ, among other things, a software-defined data model that may be used to categorize and prioritize data to be cached and then uploaded. Some embodiments of a data model may also include one or more rules governing data collection.

One approach that may be employed for transferring bulk ICV data is to use newly developed Terahertz (THz) wireless technologies. This wireless technology is capable of bitrates many orders of magnitude above traditional WIFI®, with state-of-the art systems achieving 100 Gigabits per second (Gbps) with higher speeds projected for the future. These capabilities may enable the THz technology to be effectively applied to the transfer of the large amounts data created by the ICV.

While THz technology may enable a very high-speed interface between an ICV and edge datacenter infrastructure, there are a few considerations to be addressed in order to take best advantage of the technology. One such consideration is the relatively low transmission range of THz links as compared to the transmission ranges of other wireless technologies. Another consideration is that typical vehicle data storage devices are not capable of achieving the data transfer speeds offered by THz technologies. This means that upload of vehicle data using THz infrastructure may be opportunistic in nature in a mobile vehicle. That is, the vehicle may only be able to access THz infrastructure at particular times and locations. Thus, the productive effectiveness of THz links may be limited if the vehicle data being uploaded is in an uncategorized state and limited by the maximum transfer speed of the ICV storage device.

Example embodiments of the invention may address one or more of these points by caching vehicle data to Random Access Memory (RAM), which is capable of matching the data transfer rates of THz links. This aligns with the opportunistic nature of THz connections as data transfer may only be possible fora number of seconds while the vehicle is mobile. Some example embodiments enable the cached data to be uploaded to the infrastructure as fast as possible, followed by loading the cache with new data after each data transfer event. In order to aid in productive data caching, a software-defined data model may be defined and employed to categorize and prioritize data to be cached. This data model may be modified to cache data according to the requirements of the user and may utilize simple or complex data processing algorithms, depending on the available compute resources on-vehicle. Embodiments of the invention may find application in various environments including, for example, IT (Information Technology), telco (telecommunications services and infrastructure), automotive industries, and other environments where there may be a need for managing the high data volumes of CV.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that such embodiment may utilize the bandwidth available using THz wireless links to upload bulk vehicle data to network edge infrastructure. As another example, an embodiment of the invention may provide for a relative increase in the upload speed of ICV data. Further, an embodiment of the invention may enable improved vehicle productivity by reducing idle time uploading data. An embodiment of the invention may reduce costs by removing the requirement for human control of data storage devices. An embodiment of the invention may automate prioritization of data to upload using a software-defined data model.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

A. Overview and Comparative Example

The following overview and comparative examples are provided as context for better illustrating various aspects of some example embodiments, and are not intended to limit the scope of the invention in any way.

With reference to FIG. 1, an ICV 100 is disclosed. As used herein, 'ICV' is intended to be broadly construed and embraces, but is not limited to, any mobile vehicle capable of wireless communication of data. Example mobile vehicles include any vehicle capable of traveling on/in any one or more of land, sea, and air. The example ICV 100 may include various sensors and other devices 102 that are configured to generate and/or collect data relating to the operation of the ICV 100. Such sensors 102 may include, for example, accelerometers, position sensing and tracking systems such as GPS, speedometers, tachometers, compasses, temperature sensors, humidity sensors, video cameras, still cameras, microphones, LIDAR (light/laser imaging detecting and ranging) sensors, roll sensors, pitch sensors, yaw sensors, skid sensors, braking sensors, steering sensors, and any other sensor or device configured to generate and/or collect data concerning any aspect of the ICV 100 and/or its operation.

Data from the sensors 102 may be stored in vehicle onboard data storage 104. The data storage 104 may comprise any type of storage and/or memory, examples of which include HDD (hard disk drive) 106, and SSD (solid state drives) 108, as well as the other example memory and storage types disclosed herein. The data stored in the data storage 104 may be uploaded to edge infrastructure 200 by various wireless communication system sand interfaces, examples of which include LTE (Long Term Evolution) 202, WIFI® 204, and low band 5G and high band 5G. The edge infrastructure 200 may be in communication with a datacenter (not shown).

With the comparative example of FIG. 1 in view, the following discussion addresses some limitations of that example that may be addressed by various embodiments of the invention. For example, the bandwidth available to THz links for data upload greatly exceeds the maximum data rate of current vehicle data storage 104, with data rates up to 100 Gbps and potentially beyond. THz links utilized in this manner may be expected to have reduced efficiency as their maximum transfer rate would limited to maximum speed of the data storage system 104 of the ICV 100. This limitation also exists using current wireless links but may be less detrimental in some circumstances. One approach, in the example of FIG. 1, might be to upload a limited amount of data using the LTE connection 202, upload bulk data using the WIFI® connection 204, or physically remove the data storage 104 after testing of the ICV 100. However, uploading bulk amounts of vehicle data using WIFI® 204 would require the ICV 100 to be idle for extended periods, which may not be able to be guaranteed. As well, the physical removal of the data storage 104 may not be a viable solution to data collection on production vehicles.

With continued reference to the comparative example of FIG. 1, it is noted that ultra-low latency may be an important aspect of ICV technology and can be a critical component in developing safe and reliable autonomous vehicles. The utilization of local network edge infrastructure may be applied in the proposed architectures of ICVs. Vehicles such as the ICV 100 may upload important information detected by their sensors such as pedestrians, road conditions, and accidents for example. This information may then be redistributed locally to other connected vehicles, and may also be sent to a datacenter for further processing and storage if required. In some embodiments, it may be important that critical events and information are prioritized for uploading to the edge infrastructure 200 as reducing the latency of uploading this data may be critical to increasing the awareness and safety of other local ICVs, and may potentially enable faster response times of vehicles and services in the event of an emergency. However, the definition of what constitutes critical data may be flexible, as requirements, use cases, and data collected may differ depending on the vehicle and user.

B. Considerations Relating to Data Collection/Uploading by an ICV

Currently, many automotive and autonomous driving companies use test vehicles for the collection of sensor data to be used for processing. This data may aid in developing advanced vehicle features such as collision avoidance and autonomous driving. In the case of autonomous driving, the amount of vehicle data that needs to be collected and processed for it to be effective is orders of magnitude higher than previous vehicle feature implementations. This, in turn, has created a large amount of "bulk" vehicle data that is created due to the vastly higher amount of sensor data collected from an autonomous vehicle. This bulk data is often too large to be transferred while the vehicle is mobile on existing wireless connections. As such, autonomous test vehicle operators typically use one of two common options.

Some ICV operators test their vehicles in eight-hour cycles, then upload the bulk data generated using WIFI® ac/ax while the vehicle is being re-fueled, and the driver is changed. This method typically requires the vehicle to be idle for more time than is necessary however, as it is quite common for the upload of the bulk data to take much longer than the other two tasks. This approach thus reduces the overall productivity of the vehicle as, while the vehicle is idle uploading the data, the vehicle is typically not generating any useful data.

Other ICV operators may opt to physically remove and replace the vehicle data storage at the end of each testing cycle. This approach may be beneficial when the speed of the data storage device on the ICV exceeds the speed of the uploading interface, or when the amount of data generated may result in an excessively long idle time in order to upload the data. A disadvantage to this approach is that it requires human intervention, and thus is not an automatic process. Moreover, this approach is typically only possible on test vehicles. However, if a large amount of data is needed to be processed in order to implement effective autonomous driving of vehicles, it may be the case that a fleet of test vehicles will not be capable of generating the amount of data required. Rather, collection of data from production vehicles, such as vehicles put into everyday use by consumers, may be necessary to enable effective autonomous driving.

In regards to data upload, typical production vehicles do not contain a network interface and operate in a self-contained manner, with only diagnostic interfaces available to a local user. Thus, conventional mechanisms for uploading data may be relatively primitive, where they exist at all.

C. Aspects of Some Example Embodiments

With the foregoing comparative example and other considerations in view, further details are now provided concerning various aspects of some example embodiments of the invention. In general, example embodiments may involve utilization of THz wireless communications links, and automated prioritization of vehicle data upload over wireless communication links.

C.1 THz Wireless Communication Links and Data Storage

As noted earlier herein, embodiments of the invention may employ THz wireless technologies for vehicle data upload. This technology may enable wireless links with a bandwidth far exceeding conventional WIFI® or recent mm Wave technologies. With potential data rates of 100 Gbps and higher, ICVs according to embodiments of the invention may be able to upload all their bulk data while mobile, thus reducing or eliminating the need for un-productive idle time or manual human interaction. This increase in speed however, may create a new challenge insofar as data upload rates by an ICV may be limited by the performance of the ICV on-vehicle storage.

As such, embodiments of the invention may involve, in addition to the use of THz wireless technologies, schemes for utilizing compute resources on an ICV to cache vehicle data into RAM (Random Access Memory). The use of RAM may be advantageous, at least because RAM may have much higher read/write speeds than traditional vehicle storage, and because RAM may be capable of fully utilizing the bandwidth available on a THz link.

In some embodiments, data that is cached in RAM of the ICV may be uploaded while the vehicle is mobile, with the vehicle CPU constantly loading new data into RAM as data is being uploaded from the RAM to an edge infrastructure and/or other destination(s). It should be noted that some THz links may have a limited range, such that some implementations may be capable of high data transfer rates, such as about 100 GB/s or higher, at relatively short ranges, such as about 10 m to about 50 m for example. Thus, in some embodiments, an ICV may, due to the limited range of some THz links, maintain a THz connection with roadside edge infrastructure and/or other nodes only for limited periods of time while the ICV is mobile.

After the ICV is disconnected from roadside edge infrastructure, for example, a CPU of the ICV may load more data into the RAM cache in preparation for the next THz connection. In the event that all cached data has been uploaded while the THz link is still active, that is, connected to the ICV, the vehicle may continue to upload data at the rate of its maximum storage device speed, such as its maximum RAM cache speed, or else disconnect from the edge network in order to allow another vehicle to use the THz connection.

In some embodiments, a three-tiered data storage approach may be implemented in the ICV, with data caching to RAM first, followed by maximized use of any SSDs on the vehicle, and storage of data on HDDs performed last. Use of SSDs in conjunction with the RAM cache may greatly reduce the probability of the RAM cache becoming empty and un/under-utilized at any given time. A tiered storage approach such as that just described may greatly reduce the idle time needed by a vehicle to upload data, potentially to zero idle time. The limited storage space of RAM in comparison to SSD and HDD storage may incentivize increasing the efficiency of the RAM cache in terms of the value of the data stored on it. This may be particularly so in the event that a long period of time passes without a THz link becoming available for the ICV to connect to.

C.2 Prioritization of Data for Caching and Uploading

In order to increase the effectiveness and value of the RAM cache of the ICV, embodiments of the invention may provide for categorization and prioritization of data stored in the RAM cache. This may be achieved, in some embodiments, with the use of a software-defined data model. In general, such a data model may define, for example, what data or data types will be collected, what categories of data are permissible to be stored in the RAM cache, what data types are available on-vehicle, the priority of each data type, and the amount of data processing to perform on vehicle. This approach may enable a common framework to be developed to allow ICV from different manufacturers to upload their data to the same network edge infrastructure using THz links. As embodiments of this model may be software-defined, the way(s) in which the data is processed and managed may be configurable by either the user or manufacturer to enable high data throughput performance of data related to the Key Performance Indicators (KPI) that they may require.

Figure 2:
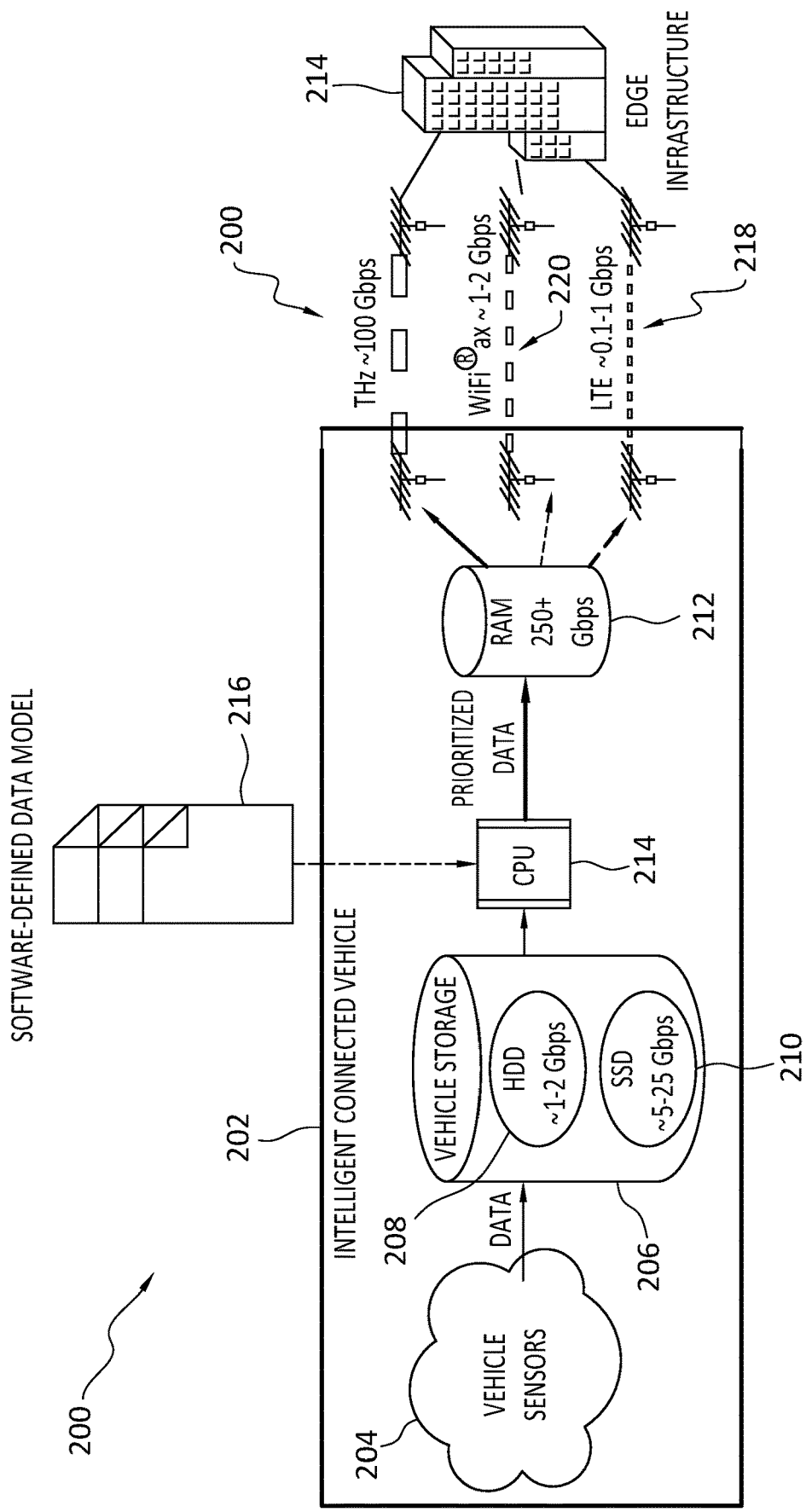
FIG. 2 discloses aspects of a data caching and transmission configuration including a data model.

With the foregoing points in view, attention is now directed to FIG. 2 which discloses an example high-level architecture 200 for one solution. As shown in FIG. 2, an ICV 202 may include one or more vehicle sensors 204 and/or other IoT (Internet of Things) devices configured to generate and/or collect data concerning operations of the ICV 202. The ICV 202 may further include data storage 206 that may comprise one or more HDDs 208 and/or one or more SSDs 210. Any size of HHD 208 and SSD 210 may be employed. In some example embodiments, an HDD 208 may have a data read/write rate of about 1 GB/s to about 2 GB/s, while an example SSD may have a data read/write rate of about 2 GB/s to about 25 GB/s. The size of storage such as HHD and SSD may be determined based on a data rate and a window of time during which the data is expected to remain in storage. Thus, for example, if the data rate coming into the storage is 2 Gb/s, and the window is 10 seconds, the necessary storage capacity would be 20 Gb.

The ICV 202 may additionally include RAM 212. Any size of RAM 212 may be employed. In some example embodiments, the RAM 212 may have a data read/write rate of about 250+GB/s. The writing of ICV 202 data from the data storage 206 to the RAM 212 may be implemented and managed by a CPU 214, which may include one or more processors, in accordance with a software-defined data model 216, an instance of which may reside in the CPU 214 and/or elsewhere in the ICV 202. As discussed in more detail below, data from the RAM 212 may be wirelessly transmitted from the ICV 202 to edge infrastructure 214, such as one or more nodes for example. Data transmission may take place on one or more wireless connections between the ICV 202 and edge infrastructure 214, such as an LTE connection 218, a WIFI® connection 220, and a THz connection 222. It is noted that embodiments of a software-defined model such as the software-defined model 216 may be referred to herein simply as a 'data model.'

In more detail, the data model 216 may execute on the CPU 214 in accordance with particular requirements set out in the data model 216. For example, the CPU 214 may cache data in the RAM 212 based on the data types and/or priorities configured in the data model 216. In some embodiments, the type and amount of processing to be performed on raw sensor data for caching may be configurable in the data model 216, such as by a user, or automatically, to maximize effective use of available compute resources on the ICV 202. Determination of available compute resources on the ICV 202 may be performed as part of execution of the data model 216, or may be performed by the CPU 214 as a separate thread from execution of the data model 216.

Data models may be configured in any of a variety of ways. To illustrate, one example of a data model may be configured to categorize data by priority, and then cache the data categorized as high priority on a vehicle with limited compute resources. The priority of particular data may be assigned on any basis, one example of which is the particular type of that data, such as audio, video, or data pertaining to one or more particular sensors or sensor types. In this way, use of the limited resources of the vehicle may be efficiently focused on the relatively high priority data. After the high priority data is cached and transmitted, lower priority data may then be cached and transmitted.

Thus, use of the cache in an ICV that has only limited computing resources may be based on considerations such as the type, and/or relative priority, of data gathered by one or more sensors. In another example, data may be prioritized for caching by relative age, such as with a First-In-First-Out (FIFO) protocol where relatively older data is cached and transmitted before relatively newer data. In a further example, data may be prioritized for caching based upon a particular event involving the ICV, such as an accident for example. In this case, data may be prioritized according to the time when it was collected. Since a crash may be of relatively short duration, respective crash-related data may be collected at about the same time by a variety of different sensors, and the crash-related data assigned a relatively higher priority for caching. As these examples illustrate, data may be prioritized for caching on any of a variety of different bases, and the scope of the invention is not limited to these examples.

Prioritized caching may also be implemented in ICVs where cache capacity is not a limiting factor. To continue with the example of a vehicle crash, even if cache capacity is not limiting, data concerning the crash may be advanced to the head of the queue for caching and transmission off the ICV.

Thus, whether employed in connection with ICVs that have limited, or more significant, computing capabilities, embodiments of the invention are not constrained to caching data only for THz transmission. Rather, data categorization functionality may be employed to cache and quickly upload data considered critical, such as data concerning an accident or emergency, using any other network interface available. As noted, other example network interfaces that may be employed in connection with embodiments of the invention include, but are not limited to, WIFI®, and LTE.

When employed with a vehicle having relatively more significant computing resources, embodiments of the data model may provide for capabilities beyond simply caching data. For example some embodiments of the data model may be configured to perform data processing as well as caching. In one particular embodiment, such data processing may include instructing, by the data model, a CPU to process a video stream from the vehicle sensors to detect objects such as pedestrians and cyclists and then cache such detected objects to RAM. In this example, the raw video stream may not be cached, while in other embodiments where significant cache resources are available at the ICV, some, or all, of the raw video stream may be cached at the ICV for transmission.

Layered prioritization schemes may also be employed in which the relative priority of a dataset, or subset of a dataset, is based on more than one, that is, multiple, criteria. For example, a prioritization scheme may specify that data (i) relating to fuel economy, and (ii) less than 1 hour old, will be assigned a particular priority. Any number and type of criteria may be employed in defining and implementing a prioritization scheme of a data model.

C.3. Further Aspects of Some Example Data Models

As disclosed earlier herein, data models according to example embodiments may possess various characteristics and attributes. Following is a brief discussion of some further characteristics of example embodiments of data models.

Data model updates may be downloaded automatically when the ICV is in range of a wireless connection. Additionally, or alternatively, a user at the ICV may update and/or reconfigure the data model. An ICV may include a library of different data models, each of which may deployed automatically or in response to user input, in particular circumstances. In some embodiments, an ICV may include a user interface (UI) that enables a user to add/modify/delete/upload/download one or more data models and/or data model libraries. Changes to a data model, and/or a data model itself, may be broadcast by an ICV to one or more other ICVs. The data model may be operable to cause the transmission of data collected by an associated ICV to one or more other ICVs.

D. Example Use Cases and Related Considerations

As disclosed herein, embodiments of the invention may possess a variety of useful functions and characteristics, one example of which is THz wireless link upload of vehicle data. The use of THz wireless links on vehicles to upload vehicle data to edge network infrastructure is a significant improvement over the use of wireless protocols such as WIFI® or LTE for data upload. The use of THz wireless links to upload data may also eliminate the need to physically remove data storage systems and devices in order to access data collected by the vehicle. Further because access to THz links may be opportunistic when a vehicle is in motion, embodiments of the invention may employ automated vehicle data caching to maximize, or at least improve, utilization of THz links relative to the utilization associated with a non-caching scenario. That is, data caching at the vehicle may enable a reduction in the amount of time that is needed by a THz link to transfer the cached data, thus freeing up the THz link relatively sooner, for additional data transfers. As well, the use of a configurable data model as disclosed herein m ay allow for greater flexibility in the processing and management of vehicle data. A software-based data model may be configured to match the capabilities of the vehicle, such as data processing, data storage, data caching, and/or, data transmission, and the requirements of a user. The designation of data as high-priority may be dynamically changed on an individual vehicle basis and may be re-configured at anytime.

Embodiments of the invention may be employed in connection with various use cases, one of which concerns a test vehicle. In the case of a test vehicle, if the location of edge THz nodes are known, then test routes may be planned that maximize the use of the RAM cache such that the vehicle does not need to idle for data upload after each test cycle. This approach may thus improve the productivity of the test vehicle by reducing idle time to the minimum possible, and removing the need for physical removal of storage to access the data stored at the vehicle. Thus, the data offloading process may be performed automatically without manual intervention or action by a user.

In a remote use case where THz nodes may be sparse, the vehicle data model may be configured to prioritize the upload of vehicle diagnostic data when in range of the next node, with low priority sensor data such as traffic information or nearby objects, only being cached and uploaded after all higher priority data has been cached, queued and uploaded. This process may be re-configured at any time, with a test vehicle prioritizing diagnostic data for one 8-hour cycle followed by, for example, prioritized uploading of video streams for machine learning and autonomous driving in the next cycle.

The ICV may include an integrated GPS system that may be used in conjunction with coordinates of known THz, and/or other, edge infrastructure nodes and the known relative speed, which may be an average speed, of the vehicle to determine the time of availability, and approximate size, of the transmission window available for upload of bulk data. One example of another type of edge infrastructure node is a 5G node. The availability and size of a window may additionally, or alternatively, be based upon an expected speed of the vehicle over an identified route. For example, if a user programs a route in a maps application of the vehicle, the route information and expected speed of the vehicle, may be used to estimate when windows may become available, and their length. The expected speed of the vehicle, in turn, may be determined based on traffic loads, traffic control features such as lights and signs, traffic incidents, road construction work, and any other input(s) that may affect vehicle speed. Note that in some embodiments, vehicles may detect and report THz node locations to a central repository that may be shared and accessible by one or more other vehicles.

A transmission window estimation, which may identify when the transmission window is expected to open, and the length of the transmission window after it is opened, may be useful in the data prioritization process as there may be high-priority bulk vehicle data that is too large to be fully transmitted within that window, such that the data cannot be processed by the edge infrastructure until the transmission is completed at the next node. However, if the transmission window availability and length are known, the ICV may avoid this situation by modifying the priority of data to optimize for transmission of complete, rather than partial, datasets on a transmission window basis. This optimization may also be applied to production vehicles. In this way, assurance may be had that a dataset will require no more than a single transmission window to be transmitted in full.

Other example use cases for some embodiments concern production vehicles, that is, vehicles in use by users/consumers and not dedicated to testing purposes. In particular, a manufacturer may configure a production vehicle with the ability to utilize THz wireless links to upload large amounts of vehicle data to edge infrastructure to be processed. Data generated by production vehicles may be particularly valuable since it may be able to be processed on a much larger scale than data generated by test vehicles in order to improve the autonomous driving capabilities of future ICVs. For example, data generated by production vehicles may be 'real world' data generated and gathered by everyday operations of the production vehicle, and is not limited to data associated with the simulated environments in which a test vehicle may largely, or exclusively, operate.

The data model may play a particularly import role in production vehicles as the path of the vehicle cannot always be predicted. The prioritization of data types and events to upload may be key to achieving good performance for ultra-low latency requirements such as emergency services. The use of a software-defined data model may allow for the data that is collected and prioritized to be configured according to external requirements. Examples include a vehicle user choosing whether to consent to the upload of vehicle data to the manufacturer, and state regulators determining the priority levels of important government service data such as emergency services. These attributes may be re-configured at any time for any vehicle without the need for a vehicle service or upgrade.

In another example scenario concerning production vehicles, a vehicle may have sensors such as a video camera and/or motion sensor that detect a pedestrian who has suddenly darted into the street. The data gathered by the sensors may activate the vehicle braking system, and the data may also be automatically transmitted by the lead vehicle to following vehicles so that the following vehicles can stop in time to avoid a collision. The data transmitted to the following vehicles may be presented in the form of an augmented reality view than enables the following vehicles to see at least a part of what the lead vehicle sees. This functionality may have very low latency requirements, since the process of detecting the pedestrian and reacting to the detection may take less than one second.

E. Example Methods

Figure 3:
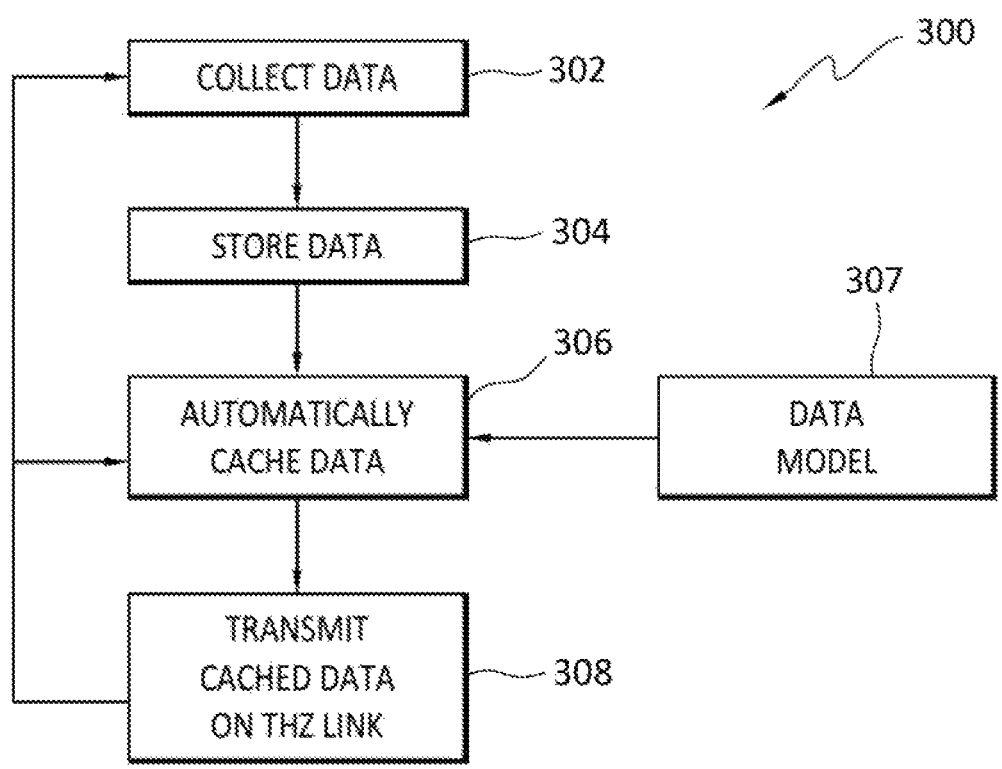
FIG. 3 discloses aspects of an example method.

Attention is directed now to FIG. 3, where methods are disclosed for automatically caching and uploading data, where one example method is denoted generally at 300. It is noted with respect to the example method of FIG. 3, as well as to any of the other disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

The example method 300 may be performed in whole, or in part, by a single entity, or cooperatively by multiple entities. In some embodiments, part or all of the method 300 may be performed, in accordance with instructions of a software model, by a system that includes one or more sensors, data storage, a CPU, and RAM. Such a system, which may be configured for communication by way of a THz link, may be included, in part or in whole, in an ICV. Likewise, the software model may be included in the ICV. However, the scope of the invention is not limited to performance of the method 300, or any portion thereof, by any particular entity or entities. As well, the method 300 may be performed, in whole or in part, while the ICV is in motion. For example, the ICV may be a test or production vehicle moving into and out of communication with one or more THz nodes, such as may be elements of an edge infrastructure.

The method 300 may begin when data is collected and/or generated 302 by one or more sensors of an ICV. The data may be collected 302 on an ongoing basis, and/or during a specified time window, or for the duration of a particular event. In some embodiments, collected data may be transmitted from the ICV to another ICV or entity.

At least some of the collected data may be stored 304 in data storage at the ICV. The data may be stored 304 in multiple different types of storage depending upon the particular constraints of an application, where such types of storage, which may have different respective write speeds, may comprise one or more HDD(s) and/or one or more SSD(s).

At least some of the stored data may be written 306 from the data storage to cache memory such as RAM. Variables such as the data to be cached, the timing of the caching, and the amount of the data to be cached, may be established by the data model 307. In more detail, a CPU may perform the caching process based on instructions and criteria specified by the data model. In some embodiments, data may be cached according to its relative priority. However, data may be cached based on additional, or alternative, criteria.

After the data has been cached 306, the cached data may then be transmitted 308 to one or more entities, such as one or more nodes of an edge infrastructure for example. Such nodes may comprise, but are not limited to, an edge device such as an IoT device, and/or edge processors. The edge infrastructure may transmit the received data to a datacenter or other entity. Transmission 308 of the cached data may comprise transmission over a THz link between the IVC and the edge infrastructure. In some circumstances, the cached data may be transmitted 308 almost immediately after being cached while, in other circumstances, the cached data may be held for a time in the cache before being transmitted 308. An example of these latter is when the IVC is located between THz links and is not able to upload data.

As shown in FIG. 3, part or all of the method 300 may be performed recursively. For example, the cache may be filled 306 and then emptied 308 repeatedly on an ongoing basis. In some instances, part or all of the method 300 may be performed automatically in response to an event, such as a change in the data model. Further, performance of at least some parts of the method 300, such as transmission of cached data 308, may be performed automatically when the IVC detects a THz link. As a final example, transmission of cached data 308 may also automatically trigger caching 306 of additional data.

F. Further Example Embodiments

Following are some further example embodiments of the invention. These are presented only byway of example and are not intended to limit the scope of the invention in any way.

Embodiment 1. A method, comprising: collecting data concerning operation of a vehicle, wherein the collecting is performed by one or more sensors of the vehicle; storing the data in storage locally at the vehicle; automatically caching the stored data in cache memory locally at the vehicle; and uploading the cached data to a node over a THz wireless link.

Embodiment 2. The method as recited in embodiment 1, wherein the stored data is automatically cached according to requirements specified in a data model.

Embodiment 3. The method as recited in any of embodiments 1-2, wherein the cached data is prioritized for uploading according to requirements specified in a data model.

Embodiment 4. The method as recited in any of embodiments 1-3, wherein the cached data is uploaded during a time window whose start time and length are calculated by a processor on the vehicle.

Embodiment 5. The method as recited in any of embodiments 1-4, further comprising uploading the cached data to another vehicle.

Embodiment 6. The method as recited in any of embodiments 1-5, wherein the cached data is uploaded to the node while the vehicle is in motion.

Embodiment 7. The method as recited in any of embodiments 1-6, wherein storing the data in storage locally at the vehicle comprises storing the data in one or more HDDs and/or one or more SSDs prior to caching.

Embodiment 8. The method as recited in any of embodiments 1-7, wherein the cache is continuously replenished with data until all of the data has been uploaded.

Embodiment 9. A system, comprising: one or more hardware processors; data storage; cache memory; and a non-transitory storage medium having stored therein instructions that are executable by the one or more hardware processors to perform the operations of any of the embodiments 1-8.

Embodiment 10. A sea, air, or land, mobile vehicle that includes the system of embodiment 9.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1-8 and 11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as any persistent or non-volatile RAM technology, solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
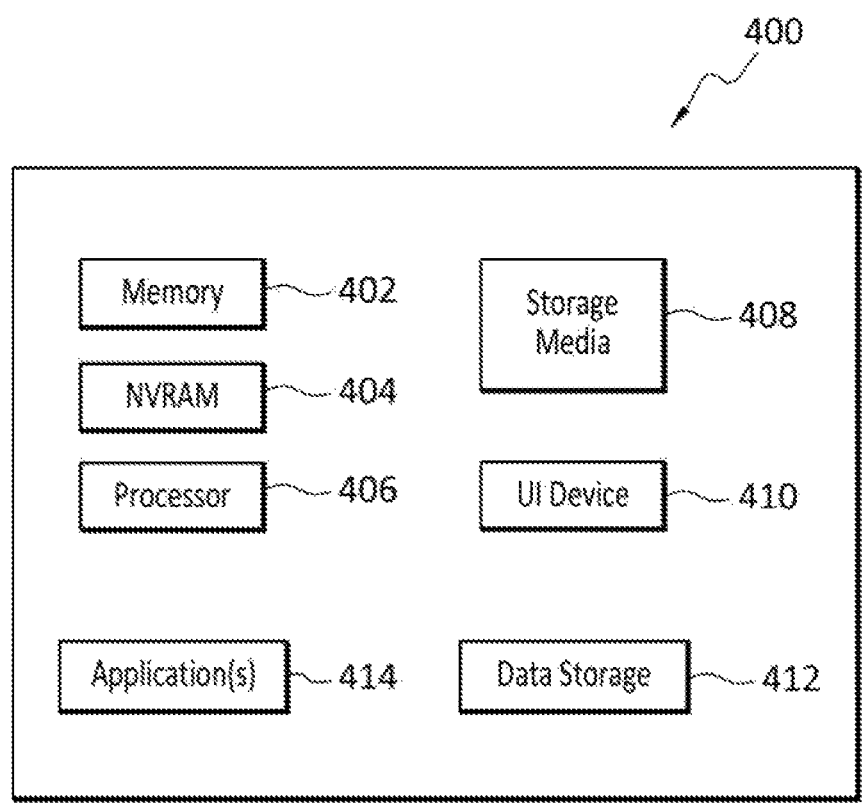
FIG. 4 discloses aspects of an example computing entity.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile random access memory (NVRAM) 404, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 402 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   collecting data concerning operation of a vehicle, wherein the collecting is performed by one or more sensors of the vehicle;
   storing the data in storage locally at the vehicle using a tiered storage approach in which any of the data that cannot initially be accommodated in a cache memory of the vehicle is stored in one or more SSDs of the vehicle, and any remaining data of the data that cannot be accommodated in the one or more SSDs is stored in one or more HDDs of the vehicle;
   using a data model to categorize some of the data as critical, and to prioritize the critical data for uploading;
   automatically caching some of the critical data in the cache memory locally at the vehicle according to the data model, wherein the cache memory is capable of matching a data transfer rate associated with a THz wireless link; and uploading the critical cached data from the cache memory, before any of the other collected data, to a node over the THz wireless link.

2. The method as recited in claim 1, wherein when the cache memory is empty, data from one of the one or more SSDs and/or one of the one or more HDDs is used to replenish the cache memory.

3. The method as recited in claim 1, wherein the cached data is uploaded during a time window whose start time and length are calculated by a processor on the vehicle.

4. The method as recited in claim 1, further comprising uploading the cached data to another vehicle.

5. The method as recited in claim 1, wherein the cached data is uploaded to the node while the vehicle is in motion.

6. The method as recited in claim 1, wherein the data model is modifiable by an operator of the vehicle.

7. The method as recited in claim 1, wherein the cache memory is continuously replenished with portions of the collected data until all of the collected data has been uploaded.

8. A non-transitory storage medium having stored therein instructions that are executable by one or more hardware processors to perform operations comprising:

collecting data concerning operation of a vehicle, wherein the collecting is performed by one or more sensors of the vehicle;

storing the data in storage locally at the vehicle using a tiered storage approach in which any of the data that cannot initially be accommodated in a cache memory of the vehicle is stored in one or more SSDs of the vehicle, and any remaining data of the data that cannot be accommodated in the one or more SSDs is stored in one or more HDDs of the vehicle;

using a data model to categorize some of the data as critical, and to prioritize the critical data for uploading;

automatically caching some of the critical data in the cache memory locally at the vehicle according to the data model, wherein the cache memory is capable of matching a data transfer rate associated with a THz wireless link; and uploading the critical cached data from the cache memory, before any of the other collected data, to a node over the THz wireless link.

9. The non-transitory storage medium as recited in claim 8, wherein when the cache memory is empty, data from one of the one or more SSDs and/or one of the one or more HDDs is used to replenish the cache memory.

10. The non-transitory storage medium as recited in claim 8, wherein the cached data is uploaded during a time window whose start time and length are calculated by a processor on the vehicle.

11. The non-transitory storage medium as recited in claim 8, wherein the operations further comprise uploading the cached data to another vehicle.

12. The non-transitory storage medium as recited in claim 8, wherein the cached data is uploaded to the node while the vehicle is in motion.

13. The non-transitory storage medium as recited in claim 8, wherein the data model is modifiable by an operator of the vehicle.

14. The non-transitory storage medium as recited in claim 8, wherein the cache memory is continuously replenished with portions of the collected data until all of the collected data has been uploaded.

15. A system, comprising:

one or more hardware processors;

data storage comprising one or more SSDs and one or more HDDs;

cache memory; and a non-transitory storage medium having stored therein instructions that are executable by the one or more hardware processors to perform operations comprising:

collecting data concerning operation of a vehicle, wherein the collecting is performed by one or more sensors of the vehicle;

storing the data in storage locally at the vehicle using a tiered storage approach in which any of the data that cannot initially be accommodated in a cache memory of the vehicle is stored in the one or more SSDs of the vehicle, and any remaining data of the data that cannot be accommodated in the one or more SSDs is stored in the one or more HDDs of the vehicle;

using a data model to categorize some of the data as critical, and to prioritize the critical data for uploading;

automatically caching some of the critical data in the cache memory locally at the vehicle according to the data model, wherein the cache memory is capable of matching a data transfer rate associated with a THz wireless link; and uploading the critical cached data from the cache memory, before any of the other collected data, to a node over the THz wireless link.

16. The system as recited in claim 15, wherein the system is installed in the vehicle.

17. The system as recited in claim 15, wherein the cached data is uploaded to the node while the vehicle is in motion.

18. The system as recited in 15, wherein the cache memory is continuously replenished with portions of the collected data until all of the collected data has been uploaded.

19. The system as recited in claim 15, wherein when the cache memory is empty, data from one of the one or more SSDs and/or one of the one or more HDDs is used to replenish the cache memory.

20. The system as recited in claim 15, wherein the cached data is uploaded during a time window whose start time and length are calculated by one of the one or more hardware processors.

* * * * *